United States Patent
Russell

(10) Patent No.: US 6,314,867 B1
(45) Date of Patent: Nov. 13, 2001

(54) INDUCTIVELY COUPLED BEVERAGE WARMER

(76) Inventor: David K. Russell, 50 SW. 142$^{nd}$ Ave., Beaverton, OR (US) 97006

( * ) Notice: Subject to any disclaimer, the term of this patent is extended or adjusted under 35 U.S.C. 154(b) by 0 days.

(21) Appl. No.: 09/586,356

(22) Filed: Jun. 2, 2000

(51) Int. Cl.$^7$ .............................. H05B 1/02; H05B 3/14; A47J 36/24
(52) U.S. Cl. ...................... 99/323.3; 99/275; 219/432
(58) Field of Search .................................. 99/323.3, 275, 99/279, DIG. 14; 219/432, 433, 386, 387, 430

(56) References Cited

U.S. PATENT DOCUMENTS

| | | | |
|---|---|---|---|
| D. 297,701 | 9/1988 | Nakagawa et al. ................ | D7/363 |
| 1,062,344 | * 5/1913 | Mann .................................. | 219/432 |
| 3,936,660 | 2/1976 | Blackwood ........................ | 219/459 |
| 4,004,130 | 1/1977 | Blackwood ........................ | 219/459 |
| 4,122,330 | 10/1978 | Fischer et al. .................... | 219/449 |
| 4,348,581 | 9/1982 | Fischer et al. .................... | 219/460 |
| 4,962,297 | 10/1990 | Lowenberg ........................ | 219/449 |
| 5,283,420 | 2/1994 | Montalto ............................ | 219/432 |
| 6,072,161 | * 6/2000 | Stein .................................. | 219/432 |
| 6,192,787 | * 2/2001 | Montalto ............................ | 99/323.3 |

* cited by examiner

Primary Examiner—Reginald L. Alexander

(57) ABSTRACT

A inductively coupled beverage warmer for safely heating a beverage contained in a container. The inductively coupled beverage warmer includes a container having a bottom wall and a side wall; and also includes a temperature sensitive switch disposed in the container, a heater connected to the temperature sensitive switch, and a secondary induction coil connected to the resistor and disposed on the bottom wall of the container; and further includes a base member including a housing having a top wall, side walls, and an circular recessed portion in the top wall; and also includes a power cord extending through a hole in the housing and being connectable to a power source, an on/off switch mounted to the housing, a contact switch moveably disposed upwardly through an opening in the recessed portion, and a primary induction coil disposed under the recessed portion and connected to the contact switch for inducing electrical current in the secondary induction coil.

9 Claims, 2 Drawing Sheets

INDUCTIVELY COUPLED BEVERAGE WARMER

BACKGROUND OF THE INVENTION

1. Field of the Invention

The present invention relates to a beverage warming apparatus and more particularly pertains to a new inductively coupled beverage warmer for safely heating a beverage contained in a container.

2. Description of the Prior Art

The use of beverage warming apparatus is known in the prior art. More specifically, beverage warming apparatus heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,283,420; U.S. Pat. No. 3,936,660; U.S. Pat. No. 4,962,297; U.S. Pat. No. Des. 297,701; U.S. Pat. No. 4,004,130; and U.S. Pat. No. 4,122,330.

While these devices fulfill their respective, particular objectives and requirements, the aforementioned patents do not disclose a new inductively coupled beverage warmer. The inventive device includes a container having a bottom wall and a side wall; and also includes a temperature sensitive switch disposed in the container, a heater connected to the temperature sensitive switch, and a secondary induction coil connected to the resistor and disposed on the bottom wall of the container; and further includes a base member including a housing having a top wall, side walls, and an circular recessed portion in the top wall; and also includes a power cord extending through a hole in the housing and being connectable to a power source, an on/off switch mounted to the housing a contact switch moveably disposed upwardly through an opening in the recessed portion, and a primary induction coil disposed under the recessed portion and connected to the contact switch for inducing electrical current in the secondary induction coil.

In these respects, the inductively coupled beverage warmer according to the present invention substantially departs from the conventional concepts and designs of the prior art, and in so doing provides an apparatus primarily developed for the purpose of safely heating a beverage contained in a container.

SUMMARY OF THE INVENTION

In view of the foregoing disadvantages inherent in the known types of beverage warming apparatus now present in the prior art, the present invention provides a new inductively coupled beverage warmer construction wherein the same can be utilized for safely heating a beverage contained in a container.

The general purpose of the present invention, which will be described subsequently in greater detail, is to provide a new inductively coupled beverage warmer apparatus and method which has many of the advantages of the beverage warming apparatus mentioned heretofore and many novel features that result in a new inductively coupled beverage warmer which is not anticipated, rendered obvious, suggested, or even implied by any of the prior art beverage warming apparatus, either alone or in any combination thereof.

To attain this, the present invention generally comprises a container having a bottom wall and a side wall; and also includes a temperature sensitive switch disposed in the container, a heater connected to the temperature sensitive switch, and a secondary induction coil connected to the resistor and disposed on the bottom wall of the container; and further includes a base member including a housing having a top wall, side walls, and an circular recessed portion in the top wall; and also includes a power cord extending through a hole in the housing and being connectable to a power source, an on/off switch mounted to the housing, a contact switch moveably disposed upwardly through an opening in the recessed portion, and a primary induction coil disposed under the recessed portion and connected to the contact switch for inducing electrical current in the secondary induction coil.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new inductively coupled beverage warmer apparatus and method which has many of the advantages of the beverage warming apparatus mentioned heretofore and many novel features that result in a new inductively coupled beverage warmer which is not anticipated, rendered obvious, suggested, or even implied by any of the prior art beverage warming apparatus, either alone or in any combination thereof.

It is another object of the present invention to provide a new inductively coupled beverage warmer which may be easily and efficiently manufactured and marketed.

It is a further object of the present invention to provide a new inductively coupled beverage warmer which is of a durable and reliable construction.

An even further object of the present invention is to provide a new inductively coupled beverage warmer which is susceptible of a low cost of manufacture with regard to both materials and labor, and which accordingly is then susceptible of low prices of sale to the consuming public, thereby making such inductively coupled beverage warmer economically available to the buying public.

Still yet another object of the present invention is to provide a new inductively coupled beverage warmer which provides in the apparatuses and methods of the prior art some of the advantages thereof, while simultaneously overcoming some of the disadvantages normally associated therewith.

Still another object of the present invention is to provide a new inductively coupled beverage warmer for safely heating a beverage contained in a container.

Yet another object of the present invention is to provide a new inductively coupled beverage warmer which includes a container having a bottom wall and a side wall; and also includes a temperature sensitive switch disposed in the container, a heater connected to the temperature sensitive switch, and a secondary induction coil connected to the resistor and disposed on the bottom wall of the container; and further includes a base member including a housing having a top wall, side walls, and an circular recessed portion in the top wall; and also includes a power cord extending through a hole in the housing and being connectable to a power source, an on/off switch mounted to the housing, a contact switch moveably disposed upwardly through an opening in the recessed portion and a primary induction coil disposed under the recessed portion and connected to the contact switch for inducing electrical current in the secondary induction coil.

Still yet another object of the present invention is to provide a new inductively coupled beverage warmer that would essentially eliminate hot plates which usually remain hot for a period of time even after the use thereof.

Even still another object of the present invention is to provide a new inductively coupled beverage warmer that essentially eliminates safety hazzards and users being burned with the hot plates.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
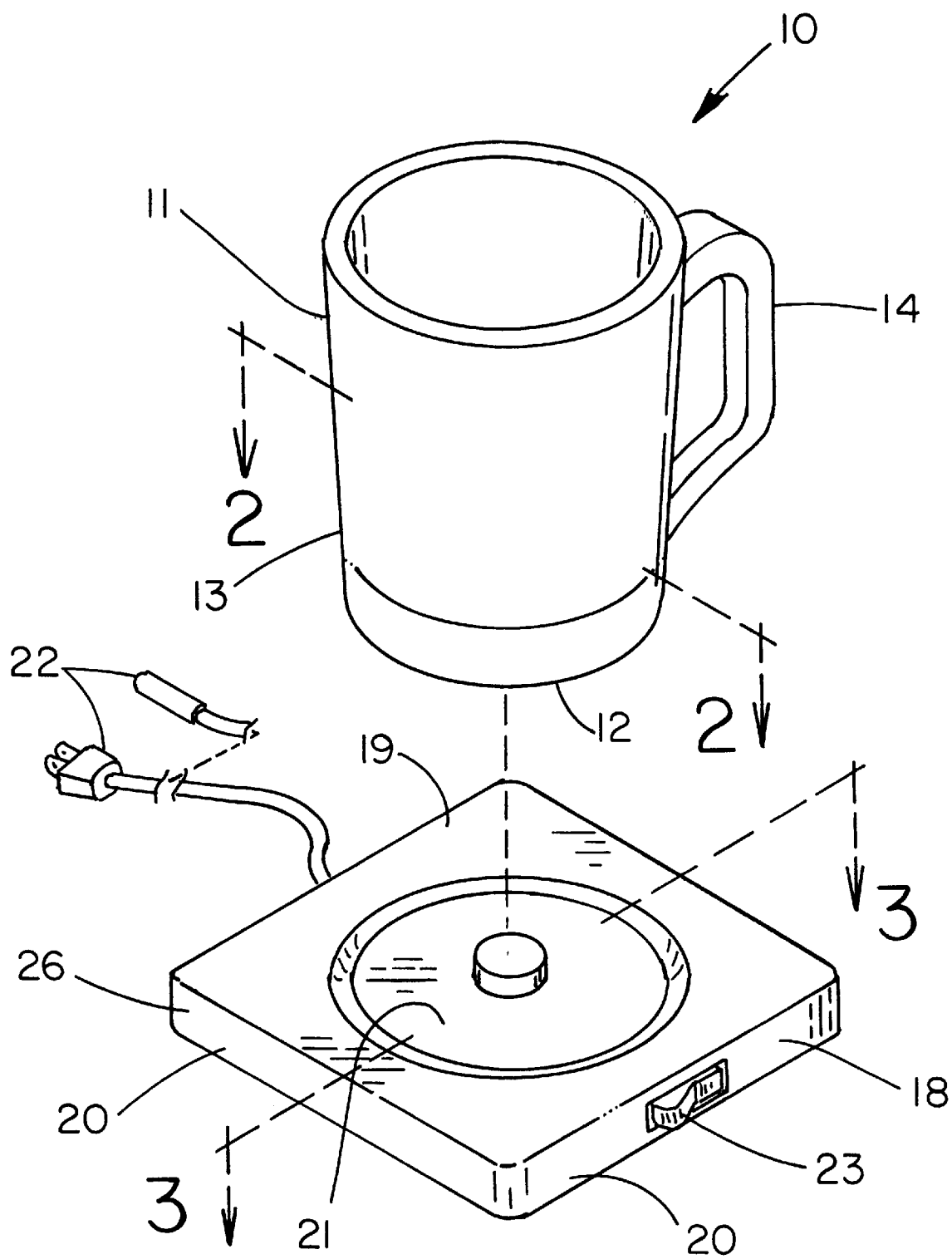
FIG. 1 is an exploded perspective view of a new inductively coupled beverage warmer according to the present invention.
Figure 2:
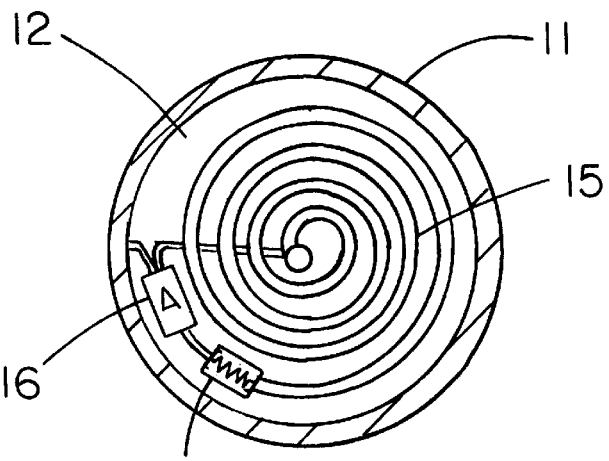
FIG. 2 is a cross sectional view of the container with the means for heating a beverage shown therein.
Figure 3:
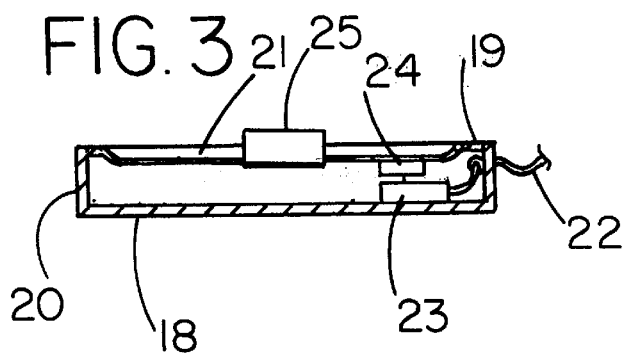
FIG. 3 is a side cross sectional view of the base member of the present invention.
Figure 4:
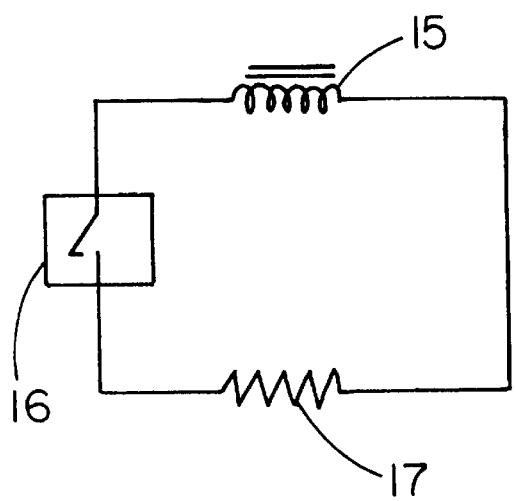
FIG. 4 is a schematic view of the means for heating a beverage of the present invention.
Figure 5:
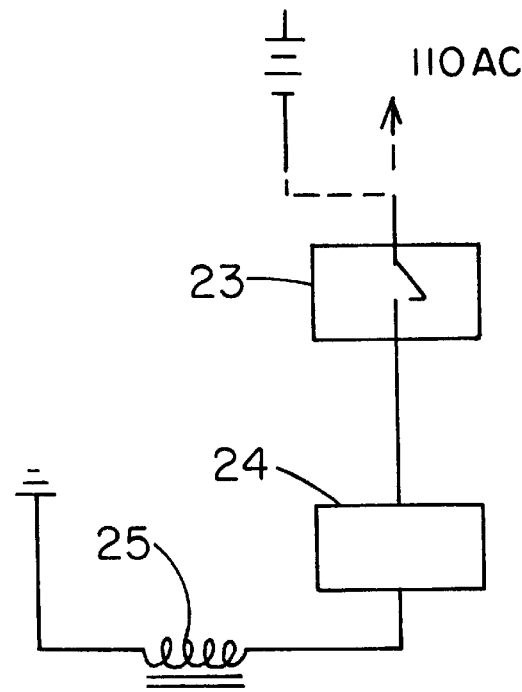
FIG. 5 is a schematic view of the means for energizing the heating means of the present invention.

With reference now to the drawings, and in particular to FIGS. 1 through 5 thereof, a new inductively coupled beverage warmer embodying the principles and concepts of the present invention and generally designated by the reference numeral 10 will be described.

As best illustrated in FIGS. 1 through 5, the inductively coupled beverage warmer 10 generally comprises a container 11 having a bottom wall 12, side wall 13, a handle member 14 securely attached to the side wall 13, a beverage holding compartment, and being adapted for holding a beverage therein. A means for heating a beverage contained in the container 11 includes a temperature sensitive switch 16 securely and conventionally disposed inside the container 11, a heater 17 securely and conventionally disposed inside the container 11 and connected to the temperature sensitive switch 16, and a secondary induction coil 15 securely disposed inside the container 11 and connected to the heater 17. The secondary induction coil 15 is disposed upon the bottom wall 12 of the container 11 for heating a beverage contained in the container 11. The means for heating a beverage may further include a means for grounding the secondary induction coil inside the container 11. The invention further includes a base member 18 including a housing 26 having a top wall 19, side walls 20, and a centrally-disposed circular recessed portion 21 in the top wall 19. The base member 11 has a height of approximately 6 inches and a width of approximately 5 inches. A means for energizing the heating means includes a power cord 22 extending into the housing 26 through a hole in a side wall 20 thereof and being adapted for connecting to a power source, an on/off switch 23 connected to the power cord 22 and being securely and conventionally disposed in and mounted to a side wall 20 of the housing 26 of the base member 18, a contact switch 24 connected to the on/off switch 23 and being moveably and conventionally disposed in the housing 26 and being in contactable relationship with the container 11 when the container 11 is placed upon the base member 18, and a primary induction coil 25 conventionally disposed in the housing 26 and extending upwardly through an opening in the recessed portion 21 of the top wall 19 of the housing 26 and being adapted for transferring electrical current to the secondary induction coil 15.

In use, the user places the container 11 having a beverage therein upon the base member 18 in the recessed portion 21 such that the bottom wall 12 of the container 11 is in contact with the contact switch 24. The user then turns on the on/off switch 23 so that electrical current is passed through to the primary induction coil 25 which induces the electrical current in the secondary induction coil 15 which is heated at a temperature regulated by the temperature sensitive switch 16 which is preset at a temperature of approximately 130 degrees Fahrenheit.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An inductively coupled beverage warmer comprising:
   a container having a bottom wall, a beverage holding compartment, and being adapted for holding a beverage therein;
   a means for heating a beverage contained in said container;
   a base member including a housing having a top wall, side walls, and a centrally-disposed circular recessed portion in said top wall; and
   a means for energizing said heating means;
   wherein said means for heating a beverage includes a temperature sensitive switch disposed inside said container, a heater disposed inside said container and connected to said temperature sensitive switch, and a secondary induction coil disposed inside said container and connected to said heater.

2. An inductively coupled beverage warmer as described in claim 1, wherein said secondary induction coil is disposed upon said bottom wall of said container for heating a beverage contained in said container.

3. An inductively coupled beverage warmer as described in claim 1, wherein said means for heating a beverage may further include a means for grounding said secondary induction coil inside said container.

4. An inductively coupled beverage warmer as described in claim 1, wherein said means for energizing said heating means includes a power cord extending into said housing through an hole in a side wall thereof and being adapted for connecting to a power source, an on/off switch connected to said power cord and being disposed in and mounted to a side wall of said housing of said base member, a contact switch connected to said on/off switch and being moveably disposed in said housing and being in contactable relationship with said container when said container is placed upon said base member; and a primary induction coil disposed in said housing and extending upwardly through an opening in said recessed portion of said top wall of said housing and being adapted for transferring electrical current to said secondary induction coil.

5. An inductively coupled beverage warmer comprising:
   a container having a bottom wall, side wall, a handle member securely attached to said side wall, a beverage holding compartment, and being adapted for holding a beverage therein;
   a means for heating a beverage contained in said container including a temperature sensitive switch disposed inside said container, a heater disposed inside said container and connected to said temperature sensitive switch, and a secondary induction coil disposed inside said container and connected to said heater, said secondary induction coil being disposed upon said bottom wall of said container for heating a beverage contained in said container, said means for heating a beverage capable of including a means for grounding said secondary induction coil inside said container;
   a base member including a housing having a top wall, side walls, and a centrally-disposed circular recessed portion in said top wall said base member having a height of approximately 6 inches and a width of approximately 5 inches; and
   a means for energizing said heating means including a power cord extending into said housing through an hole in a side wall thereof and being adapted for connecting to a power source, an on/off switch connected to said power cord and being disposed in and mounted to a side wall of said housing of said base member, a contact switch connected to said on/off switch and being moveably disposed in said housing and being in contactable relationship with said container when said container is placed upon said base member; and a primary induction coil disposed in said housing and extending upwardly through an opening in said recessed portion of said top wall of said housing and being adapted for transferring electrical current to said secondary induction coil.

6. An inductively coupled beverage warmer comprising:
   a container having a bottom wall, a beverage holding compartment, and being adapted for holding a beverage therein;
   a means for heating a beverage contained in said container;
   a base member including a housing having a top wall, side walls; and
   a means for energizing said heating means;
   wherein said means for heating a beverage includes a temperature sensitive switch disposed inside said container, a heater disposed inside said container and connected to said temperature sensitive switch, and a secondary induction coil disposed inside said container and connected to said heater.

7. An inductively coupled beverage warmer as described in claim 6, wherein said secondary induction coil is disposed upon said bottom wall of said container for heating a beverage contained in said container.

8. An inductively coupled beverage warmer as described in claim 6, wherein said means for heating a beverage may further include a means for grounding said secondary induction coil inside said container.

9. An inductively coupled beverage warmer as described in claim 6, wherein said base member has a recessed portion in said top wall, and said means for energizing said heating means includes a power cord extending into said housing through an hole in a side wall thereof and being adapted for connecting to a power source, an on/off switch connected to said power cord and being disposed in and mounted to a side wall of said housing of said base member, a contact switch connected to said on/off switch and being moveably disposed in said housing and being in contactable relationship with said container when said container is placed upon said base member; and a primary induction coil disposed in said housing and extending upwardly through an opening in said recessed portion of said top wall of said housing and being adapted for transferring electrical current to said secondary induction coil.

* * * * *